No. 885,870. PATENTED APR. 28, 1908.
R. SCHNEIDER & P. G. ROESTI.
RELEASING GEAR FOR ENGINES.
APPLICATION FILED MAR. 16, 1907.
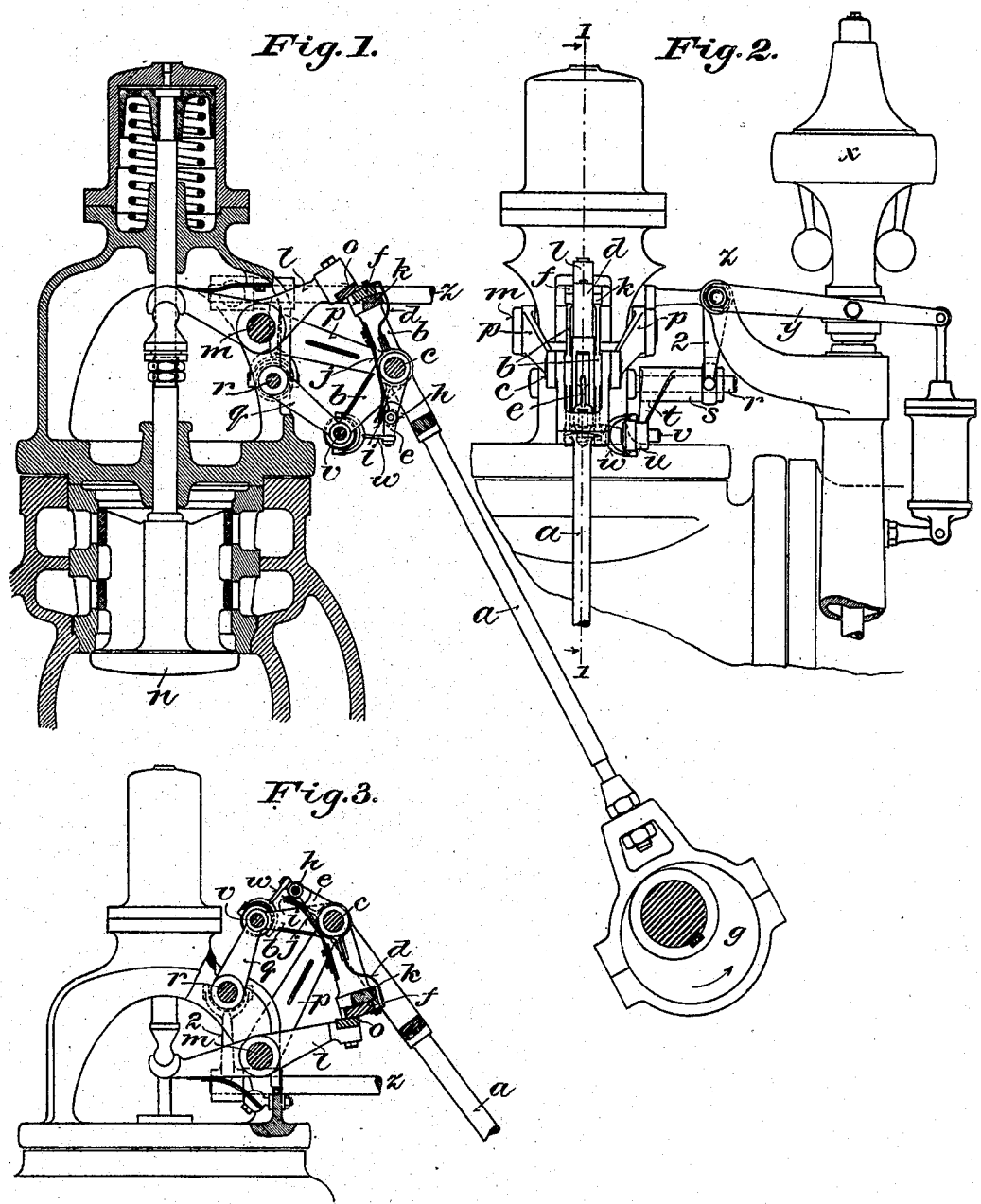
Witnesses:
Inventors,
Rudolph Schneider
Paul G. Roesti
By Whittlesey Landers Bothun & Fawcett
Attorneys.

UNITED STATES PATENT OFFICE.

RUDOLPH SCHNEIDER AND PAUL G. ROESTI, OF MILWAUKEE, WISCONSIN.

RELEASING-GEAR FOR ENGINES.

No. 885,870.  Specification of Letters Patent.  Patented April 28, 1908.

Application filed March 16, 1907. Serial No. 362,709.

*To all whom it may concern:*

Be it known that we, RUDOLPH SCHNEIDER and PAUL G. ROESTI, citizens of the Republic of Switzerland, residing at Milwaukee, in the county of Milwaukee and State of Wisconsin, have invented certain new and useful Improvements in Variable Releasing-Gear for Engines, of which the following is a specification, reference being had to the accompanying drawing, forming a part thereof.

This invention relates to valve releasing gear for steam and gas or internal combustion engines and the like. Its main objects are to avoid reaction of the releasing gear upon the governor and jumping or oscillation thereof due to such reaction, to admit of the employment of lighter and more sensitive governors, and governors of the same size and weight for large and small engines, and generally to improve the construction and operation of releasing gear of this class.

It consists of certain novel features of construction and in the peculiar arrangement and combinations of parts as hereinafter particularly described and pointed out in the claims.

In the accompanying drawing like characters designate the same or similar parts in the several figures.

Figure 1 is a section on the line 1 1, Fig. 2, of releasing gear embodying the present invention as applied to an internal combustion engine in connection with an inlet valve; Fig. 2 is a side elevation of the same; and Fig. 3 is a sectional view similar to Fig. 1 of a modified arrangement of the gear as applied to the admission valve of a steam engine.

Referring to Figs. 1 and 2, the actuating member or element of the releasing gear comprises a reciprocating rod $a$, a double armed or forked angular clutch lever $b$ fulcrumed at its elbow on a cross pin $c$ in the forked end of the rod $a$, a jointed trip lever having a spring arm $d$ and an arm $e$ yieldingly connected with each other and both pivoted on the pin $c$, and a trip block $f$ attached to the spring arm $d$. The rod $a$ in the present instance is connected directly with an eccentric $g$ mounted on the lay shaft of the engine. The arm $e$ of the trip lever is provided with a friction roller $h$, and the hub of the spring arm $d$ has a forked extension $i$ with a cross piece which is normally held in contact with the roller $h$ by spring $j$ attached to the upper arm of the clutch lever $b$.

The upper end of the lever $b$ is formed or provided with a clutch member $k$ which connects its two limbs and has on its upper or outer side a clutch face curved concentrically with the axis of the pivot pin $c$. The inner face of the trip block $f$ is curved to correspond with the outer face of the clutch member $k$ and constitutes the opposing member of the clutch, the clutch faces being roughened or otherwise formed to prevent their slipping one against the other when they are brought into engagement.

The actuated member of the releasing gear in the present instance consists of a lever $l$ fulcrumed on a pin $m$ in the valve bonnet, and engaging at one end with the stem of the inlet valve $n$ which is seated by a spring in the usual way, the lever $l$ being held in engagement with the valve stem by a leaf spring, as shown in Fig. 1. At the other end it is formed or provided with a trip bearing or block $o$, concaved to fit the outer convex face of the trip block $f$, the working faces of both trip bearings or blocks being of cylindrical form and concentric or coaxial with the pivot pin $c$, to insure perfect surface contact between them during the entire period of their engagement.

A double or forked rocker arm or link $p$ connects the pivot pin $c$ with the pivot pin $m$ and serves to guide the actuating member of the gear in the proper relation to the actuated member.

The lower arm of the clutch lever $b$ is connected by a link or rocker arm $q$ with the valve bonnet, and on the extended pivot pin $r$ connecting said link with the bonnet, is mounted and axially movable an oscillatory sleeve $s$. This sleeve is formed or provided with an arm $t$ corresponding in length with the link $q$ and having a collar $u$ guided on the extended pivot pin $v$ which connects the lever $b$ with the link $q$. A link or rod $w$ connects the collar $u$ with the arm $e$ of the trip lever.

$x$ represents a centrifugal governor, which may be of any suitable construction or type, connected by a lever arm $y$ with a rocker shaft $z$, arranged transversely to the sleeve $s$ and connected therewith by a forked arm 2.

In the operation of this form of the releasing gear when the trip block $f$ is engaged with the opposing trip block or bearing $o$, it is forced against the clutch member $k$ and held thereby immovable with relation to said clutch member and the lever b, until the actuated member is dropped or released by the normal operation of the mechanism. When this occurs, the resiliency of the spring arm d moves the trip block f out of contact with the clutch member k, or releases it from engagement therewith, so that it may be freely shifted by the governor into a different position relative thereto and to the opposing trip block or bearing o. If during the engagement of the trip blocks or bearings a change occurs in the speed of the engine, the governor is free to assume a position corresponding therewith by reason of the yielding and elastic connection between it and the trip block f afforded by the spring arm d and the spring j when the sleeve s is moved in one direction, and by the jointed connection between the arms d and e when said sleeve is moved in the opposite direction. In case of a change of position in the governor during engagement of the trip blocks, the adjustable block f as soon as it is disengaged from the block or bearing o and released from the clutch member k, will be shifted by the strained spring arm d or the strained spring j to a new position exactly corresponding with that assumed by the governor, and in the operation of the releasing gear there will be no reaction upon the governor by reason of the pressure exerted upon and transmitted through the trip blocks or bearings. The work of the governor is thus confined to shifting the position of the adjustable trip block f with relation to the actuating member, such movement being resisted only by the tension of the light spring arm d and of the spring j, and the friction of the movable connection between the governor and said trip block. As this work is light and substantially constant, it follows that smaller or lighter and more sensitive governors may be employed and that the same governor may be used to regulate large as well as small engines.

Referring to Fig. 3, showing a modification of the releasing gear for use in connection with a steam admission valve which opens upwardly instead of downwardly, as in the case of the valve shown in Fig. 1, the construction and operation of the main parts of the mechanism are essentially the same except that the clutch and trip levers and their connections are inverted.

We claim:

1. In variable releasing gear for engines the combination of actuating and actuated members one of which has a trip block movably connected therewith, a governor and an elastic connection between the governor and said trip block, operative during the normal operation of the engine, substantially as described.

2. In variable releasing gear for engines the combination of actuating and actuated members one of which has a clutch member and a trip block movable with relation to said clutch member, a governor having an elastic connection arranged to shift said trip block while it is disengaged from said clutch member, said trip block being adapted and arranged while engaged with the other member of the releasing gear to be engaged by and held immovable with relation to the clutch member, substantially as described.

3. In variable releasing gear for engines the combination of actuating and actuated members provided with trip bearings, a trip adjusting arm or lever pivoted to one of said members, a link connection between that member and a fixed part or support, a sleeve arranged and movable axially with relation to the fixed pivot of said link connection, a governor connected with said sleeve, and a connection between said sleeve and said trip adjusting arm or lever, substantially as described.

4. In a variable releasing gear for engines the combination of actuating and actuated members, a lever fulcrumed to one of said members, a trip block carried by one arm of said lever, and a link connecting the other arm of said lever with a fixed support, substantially as described.

5. In variable releasing gear for engines the combination of an actuated member provided with a trip bearing, an actuating member comprising a reciprocating rod provided with a clutch member, a trip lever fulcrumed to said rod and having a spring arm, and a trip block attached to said spring arm adjacent to said clutch member; a link connection between said rod and a fixed support, a sleeve arranged and movable axially with relation to the fixed pivot of said link connection, a governor connected with said sleeve, and a connection between said sleeve and said trip lever, substantially as described.

6. In variable releasing gear for engines the combination of an actuated member consisting of a lever provided with a trip bearing, an actuating member comprising a reciprocating rod, a lever fulcrumed to said rod, and provided on one arm with a clutch member, a trip lever fulcrumed to said rod concentrically with said clutch lever and having a spring arm, and a trip block attached to said spring arm adjacent to said clutch member; a link connecting the other arm of the clutch lever with a fixed part or support, a sleeve arranged and movable axially with relation to the fixed pivot of said link, a governor connected with said sleeve, and a connection between said sleeve and the other arm of the trip lever, substantially as described.

7. In variable releasing gear for engines the combination of an actuated member provided with a trip bearing, an actuating member comprising a reciprocating rod, and a trip lever fulcrumed to said rod and provided with a trip bearing, a link connection between said rod and a fixed support, a sleeve arranged and movable axially with relation to the fixed pivot of said link connection, a rocker shaft arranged transversely to said sleeve and having an arm connected therewith, a governor connected with said rocker shaft, and a link connection between said sleeve and the trip lever, substantially as described.

In witness whereof we hereto affix our signatures in presence to two witnesses.

RUDOLPH SCHNEIDER.
PAUL G. ROESTI.

Witnesses:
CHAS. L. GOSS,
AUGUSTA ERDMANN.